(12) United States Patent
Miller et al.

(10) Patent No.: US 11,810,251 B2
(45) Date of Patent: Nov. 7, 2023

(54) REMOTE SENSING METHOD TO MODEL TERRAIN SHAPE BY DETECTING RELIABLE GROUND POINTS

(71) Applicant: GENERAL ELECTRIC COMPANY, Schenectady, NY (US)

(72) Inventors: James Vradenburg Miller, Clifton Park, NY (US); Walter V Dixon, III, Duanesburg, NY (US); Mohammed Yousefhussien, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 893 days.

(21) Appl. No.: 16/591,928

(22) Filed: Oct. 3, 2019

(65) Prior Publication Data

US 2021/0104182 A1 Apr. 8, 2021

(51) Int. Cl.
*G06T 17/05* (2011.01)
*G09B 29/12* (2006.01)
(Continued)

(52) U.S. Cl.
CPC .............. *G06T 17/05* (2013.01); *G01C 11/28* (2013.01); *G06T 7/12* (2017.01); *G06T 15/205* (2013.01);
(Continued)

(58) Field of Classification Search
CPC ........ G09B 29/12; G09B 25/06; G01C 11/28; G01C 21/3826; G01C 21/3852;
(Continued)

(56) References Cited

U.S. PATENT DOCUMENTS 5,053,778 A * 10/1991 Imhoff .................... G01S 13/86
  342/26 B
7,164,883 B2 1/2007 Rappaport et al.
(Continued)

FOREIGN PATENT DOCUMENTS

CN 101814102 B 12/2011
CN 104574512 A 4/2015

OTHER PUBLICATIONS

Takaku, J., Tadono, T. and Tsutsui, K., 2014. Generation of High Resolution Global DSM From ALOS Prism. ISPRS Annals of Photogrammetry, Remote Sensing & Spatial Information Sciences.*

(Continued)

*Primary Examiner* — Zhitong Chen
(74) *Attorney, Agent, or Firm* — Buckley, Maschoff & Talwalkar LLC

(57) ABSTRACT

According to some embodiments, a system, method and non-transitory computer-readable medium are provided comprising an imagery data source storing image data from a plurality of images; a ground point module; a memory storing program instructions; and a ground point processor, coupled to the memory, and in communication with the ground point module and operative to execute the program instructions to: receive image data for an area of interest (AOI); generate a digital surface map from the received image data, wherein the digital surface map includes an elevation value for each of a plurality of points on the digital surface map; generate a ground point sampling based on the elevation values for the plurality of points on the digital surface map; generate an image boundary sampling based on elevation values for the plurality of points along a plurality of edges of the area of interest; and interpolate the generated ground point sampling and the image boundary sampling to (Continued)

generate a digital terrain map. Numerous other aspects are provided.

20 Claims, 7 Drawing Sheets

(51) Int. Cl.
*G09B 25/06* (2006.01)
*G06T 7/12* (2017.01)
*G01C 11/28* (2006.01)
*G06T 15/20* (2011.01)
*G06V 20/10* (2022.01)
*G06V 10/764* (2022.01)

(52) U.S. Cl.
CPC .......... *G06V 10/764* (2022.01); *G06V 20/176* (2022.01); *G06V 20/182* (2022.01); *G09B 25/06* (2013.01); *G09B 29/12* (2013.01); *G06T 2207/10028* (2013.01)

(58) Field of Classification Search
CPC ......... G06T 7/12; G06T 15/205; G06T 17/05; G06T 2207/10028; G06T 2207/10032; G06T 2207/30184; G06T 2207/30188; G06T 7/593; G06V 20/176; G06V 20/182; G06K 9/627
See application file for complete search history.

(56) References Cited

U.S. PATENT DOCUMENTS

| | | | |
|---|---|---|---|
| 8,116,922 | B2 | 2/2012 | Weinmann et al. |
| 8,244,026 | B2 | 8/2012 | Nahari et al. |
| 8,253,724 | B2 | 8/2012 | Strassenburg-Kleciak et al. |
| 2005/0024492 | A1 | 2/2005 | Schaefer et al. |
| 2014/0205189 | A1* | 7/2014 | Cao ..................... G06V 20/188 382/160 |
| 2015/0042648 | A1* | 2/2015 | Jung ..................... G06V 20/13 345/420 |
| 2017/0127606 | A1* | 5/2017 | Horton ................... G01S 19/14 |

OTHER PUBLICATIONS

Barrand, N.E., Murray, T., James, T.D., Barr, S.L. and Mills, J.P., 2009. Optimizing photogrammetric DEMs for glacier volume change assessment using laser-scanning derived ground-control points. Journal of Glaciology, 55(189), pp. 106-116.*

Villanueva, J.K.S. and Blanco, A.C., 2019. Optimization of ground control point (GCP) configuration for unmanned aerial vehicle (UAV) survey using structure from motion (SFM). The International Archives of Photogrammetry, Remote Sensing and Spatial Information Sciences, 42, pp. 167-174.*

Escobar Villanueva, J.R., Iglesias Martínez, L., and Pérez Montiel, J.I., 2019. DEM generation from fixed-wing UAV imaging and LiDAR-derived ground control points for flood estimations. Sensors, 19(14), p. 3205.*

* cited by examiner

REMOTE SENSING METHOD TO MODEL TERRAIN SHAPE BY DETECTING RELIABLE GROUND POINTS

GOVERNMENT SUPPORT

This invention was made with government support under D17PC00287 awarded by the U.S. Department of Interior, and supported by the Office of the Director of National Intelligence (ODNI), Intelligence Advanced Research Projects Activity (IARPA). The government has certain rights in the invention.

BACKGROUND

A digital terrain model is a mathematical representation (model) of the ground surface, most often in the form of a regular grid, in which a unique elevation value is assigned to each pixel. The digital terrain model typically includes only the Earth's surface, excluding vegetation as well as buildings or other man-made features. This terrain information maybe used in various geo-related applications such as hydrology, natural hazard process modelling and geomorphological mapping. Conventional techniques to construct terrain models may work well in specific circumstances. For example, these conventional techniques work well where at least one of: the terrain is very level, the buildings are isolated, the buildings are of a known size, there is little elevated vegetation (e.g., trees), the ground cover is predictable in appearance, the building materials are well known, and the computational complexity is not a concern.

It would be desirable to provide systems and methods to improve digital terrain models in an automatic and accurate manner.

SUMMARY

According to some embodiments, a system includes an imagery data source storing image data from a plurality of images; a ground point module; a memory storing program instructions; and a ground point processor, coupled to the memory, and in communication with the ground point module and operative to execute the program instructions to: receive image data for an area of interest (AOI); generate a digital surface map from the received image data, wherein the digital surface map includes an elevation value for each of a plurality of points on the digital surface map; generate a ground point sampling based on the elevation values for the plurality of points on the digital surface map; generate an image boundary sampling based on elevation values for the plurality of points along a plurality of edges of the area of interest; and interpolate the generated ground point sampling and the image boundary sampling to generate a digital terrain map.

According to some embodiments, a computer-implemented method includes receiving image data for an area of interest (AOI); generating a digital surface map from the received image data, wherein the digital surface map includes an elevation value for each of a plurality of points on the digital surface map; generating a ground point sampling based on the elevation values for the plurality of points on the digital surface map; generating an image boundary sampling based on elevation values for the plurality of points along a plurality of edges of the area of interest; and interpolating the generated ground point sampling and the image boundary sampling to generate a digital terrain map.

According to some embodiments, a non-transitory computer-readable medium storing instructions that, when executed by a computer processor, cause the computer processor to perform a method including receiving image data for an area of interest (AOI); generating a digital surface map from the received image data, wherein the digital surface map includes an elevation value for each of a plurality of points on the digital surface map; generating a ground point sampling based on the elevation values for the plurality of points on the digital surface map; generating an image boundary sampling based on elevation values for the plurality of points along a plurality of edges of the area of interest; and interpolating the generated ground point sampling and the image boundary sampling to generate a digital terrain map.

Some technical effects of some embodiments disclosed herein are improved systems and methods to automatically generate a digital terrain model. The digital terrain model (DTM) may, in some embodiments, model the shape of the terrain over a large region (e.g., $km^2$), across a range of terrain types (level, sloped, urban, country, barren, vegetated), and in the presence of a diversity of building sizes and building densities based on remote sensing data. One or more embodiments combine information from a variety of sources to identify locations that are reliable ground points. Each reliable ground point may model a limited area of the terrain. One or more embodiments provide for interpolating between reliable ground points to trace the complete terrain model over an area of interest. The reliable ground points may, in one or more embodiments, be identified sequentially as the global minimum in a remaining un-modeled area of a digital surface model.

With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DETAILED DESCRIPTION

Figure 1:
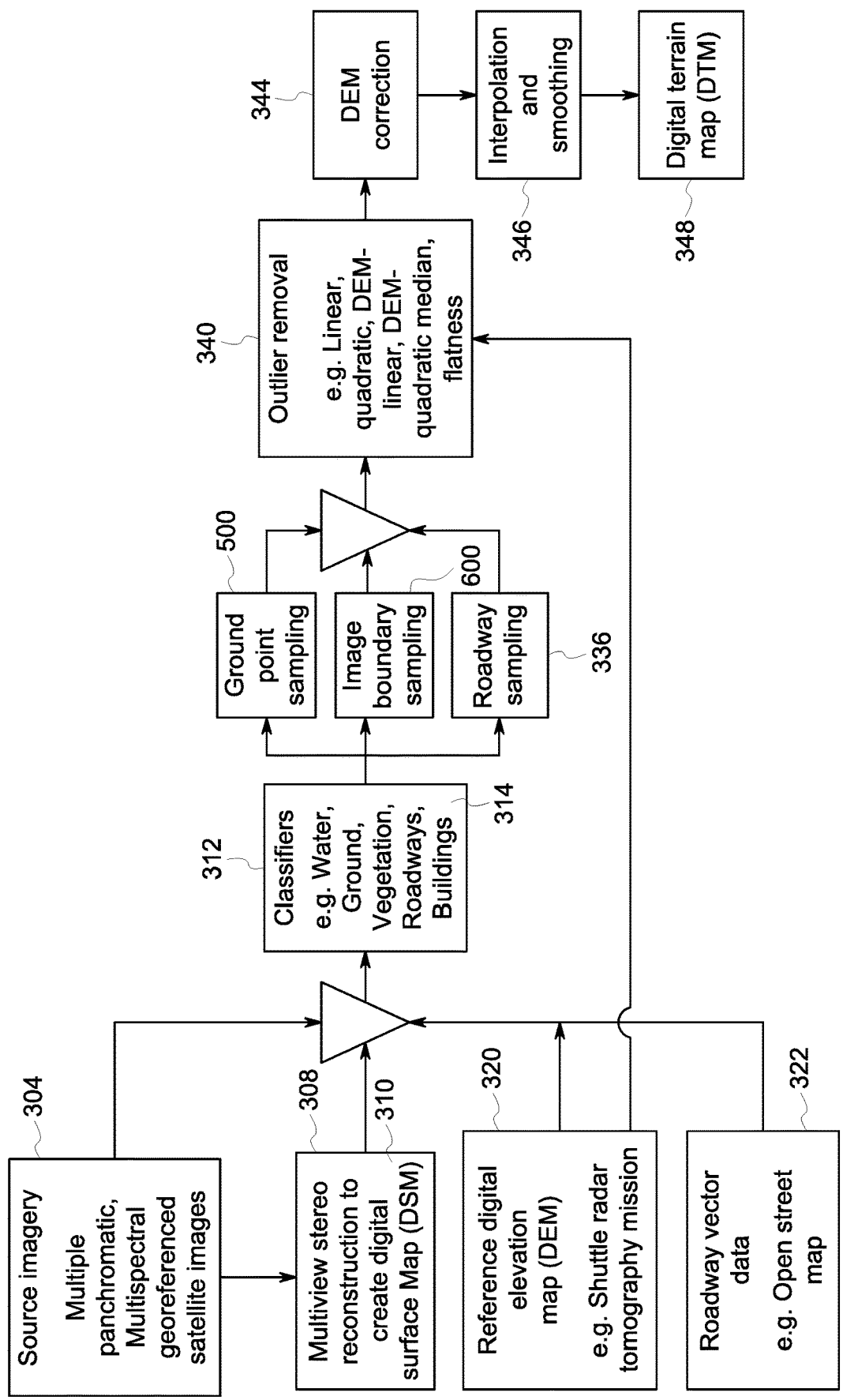
FIG. 1 is a block diagram of a system according to some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Conventional processes to generate digital terrain models may include analyzing satellite imagery. The conventional processes may reconstruct geometric models of terrain, buildings, structures, etc. based on the satellite imagery, identify where the buildings/structures are, and remove them from the model to create the digital terrain model. However, as described above, this process of identifying buildings/structures/vegetation may be difficult when the terrain is not flat (e.g., a city is built in a mountainous area and/or an area with changing elevations).

In one or more embodiments, a ground point module may identify viable ground points. The viable ground points may be identified by searching an area of interest in an image to identify an individual sampling of points that the module is confident are ground. The ground point module may systematically cover the area of interest with ground points. In one or more embodiments the ground point module may receive an area of interest (AOI) for which to create a digital terrain model. The ground point module may then identify a first ground point in the AOI based on an elevation of that point. Then that identified first ground point and an area around that point may be marked as "modeled," and may be removed from the AOI. Next, the ground point module may identify a second ground point in the remaining AOI (e.g., the AOI outside of the first ground point area/not in an area already marked as "modeled"). This process may continue with identifying areas, and then removing the identified area from consideration in the identification of the next area, allowing the ground point module to iteratively and sequentially identify ground points, until the entire terrain is sufficiently modeled. In one or more embodiments, the ground point module may execute an interpolation process to estimate values between the identified ground points. The identified ground points and estimated values may be used by the ground point module to generate a digital terrain map. One or more embodiments may provide a reliable ground point model of an area of the terrain, may discard small areas so that the ground point sampling is not forced to place points on top of buildings, and may terminate the search when a sufficient amount of the terrain has been modeled. It is noted that the size of an area modeled as a reliable ground point may be adapted to local slope of the terrain, using larger areas when the terrain is level and smaller areas when the terrain is sloped.

Figure 2:
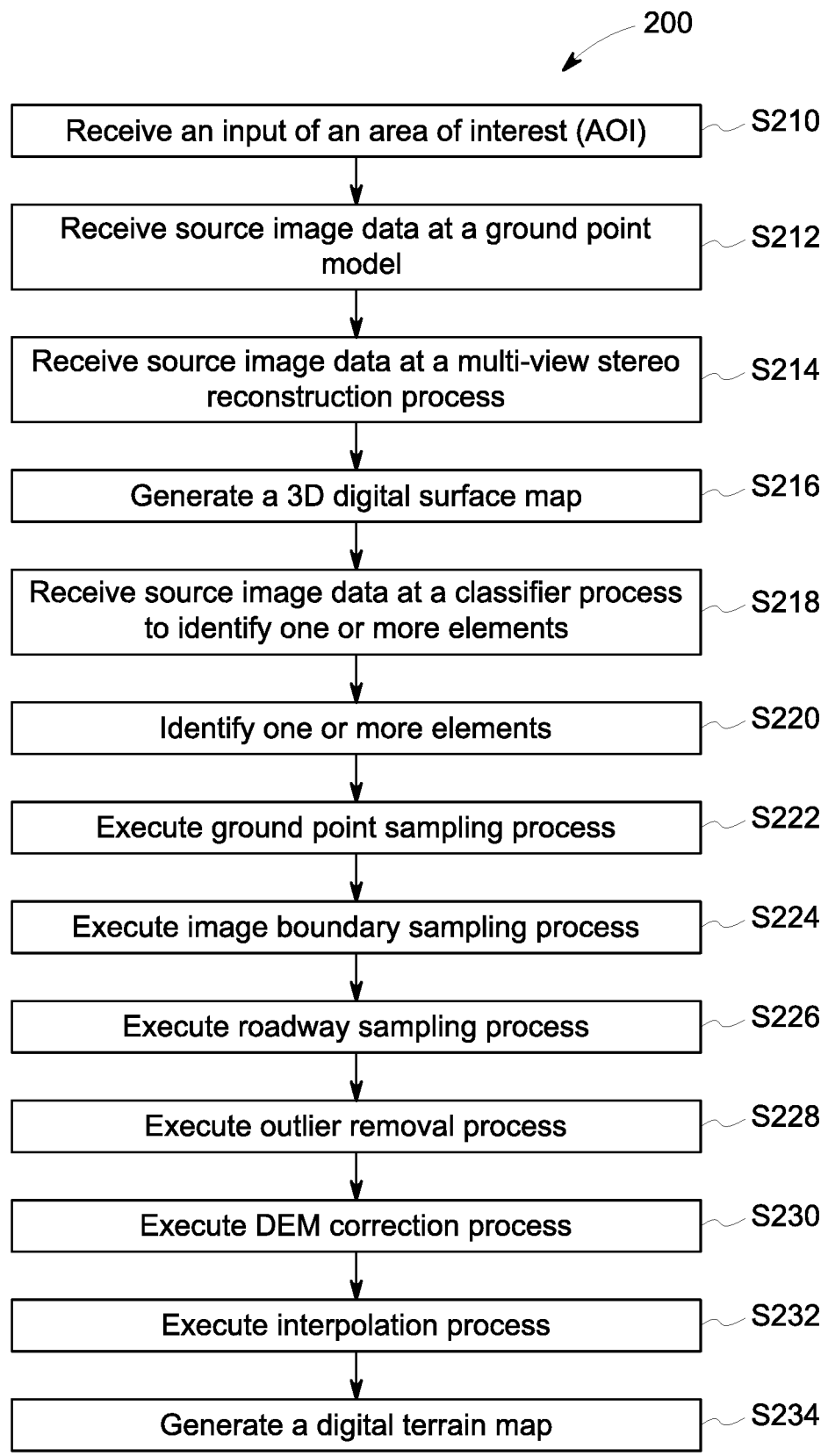
FIG. 2 is a method according to some embodiments.
Figure 5:
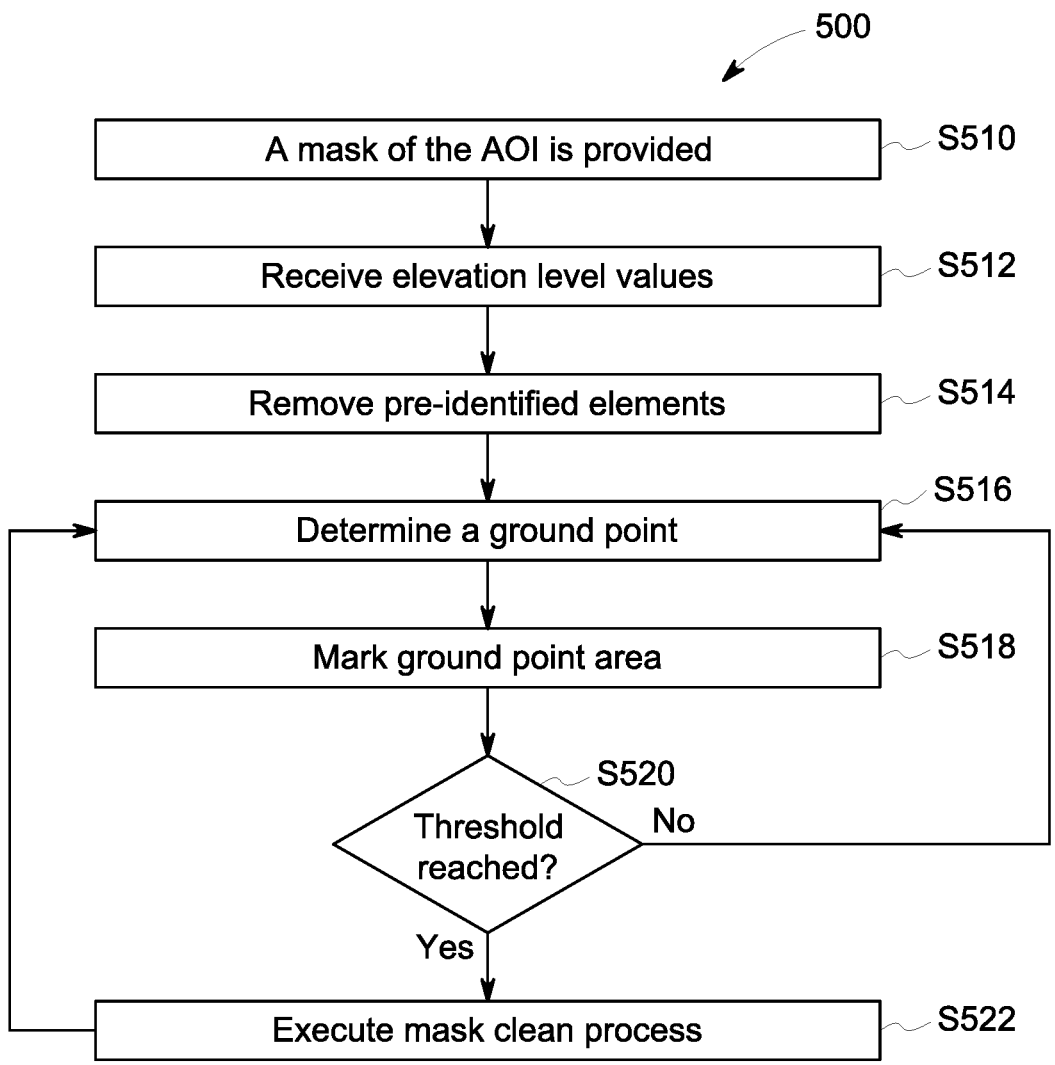
FIG. 5 is a method according to some embodiments.
Figure 6:
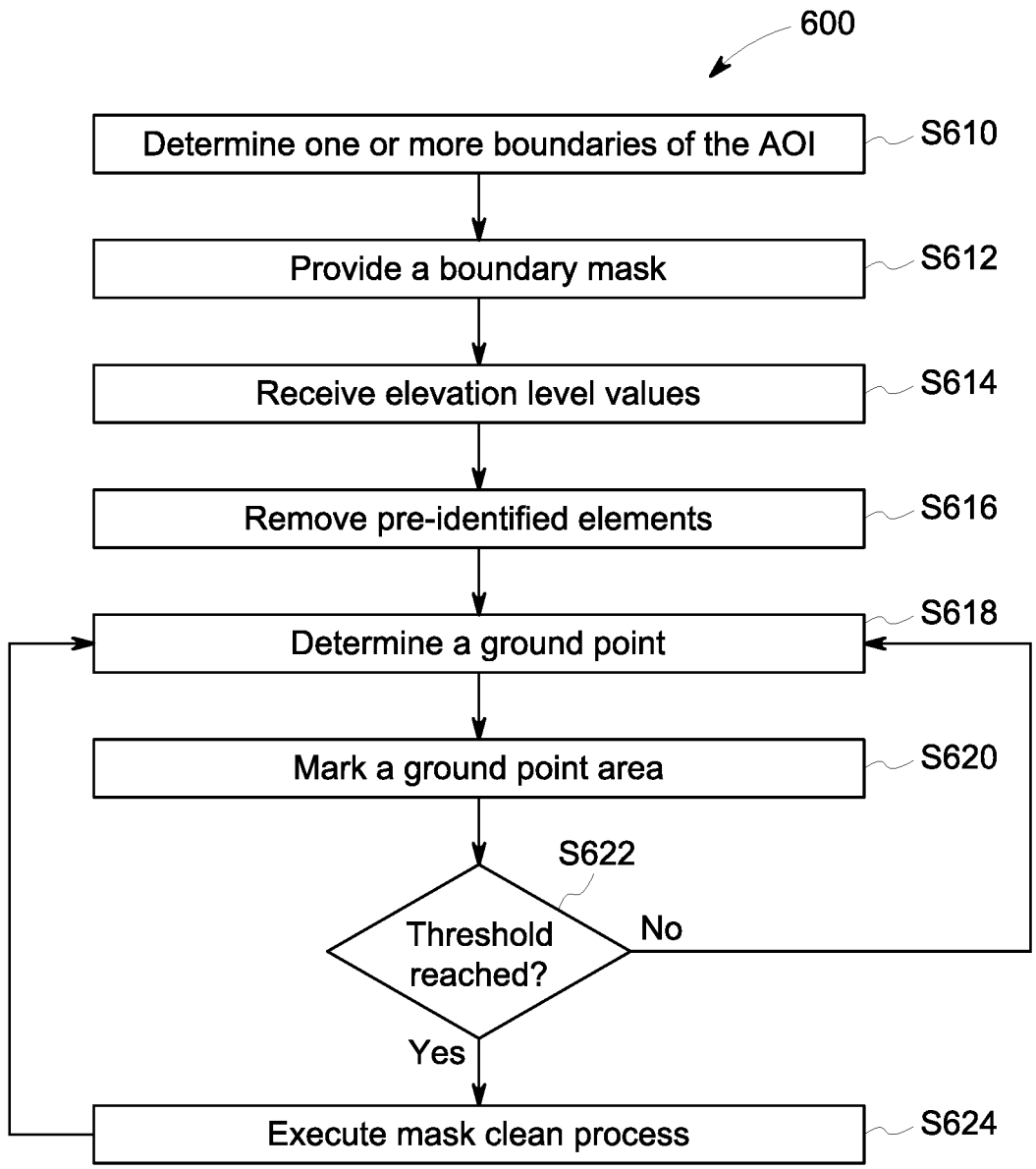
FIG. 6 is a method according to some embodiments.

Turning to FIGS. 1-6, a system 300 and diagrams of examples of operation according to some embodiments are provided. In particular, FIGS. 2, 5 and 6 provides a flow diagram of a process 200/500/600, according to some embodiments. Process 200/500/600, and any other process described herein, may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 300 is conditioned to perform the process 200/500/600 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow charts described herein do not imply a fixed order to the steps, and embodiments of the present invention may be practiced in any order that is practicable.

Initially, at S210, an input 302 of an area of interest (AOI) 402 is received. The AOI 402 may be the area where ground values may be determined by the processes described herein. It is noted that the determination of the ground/terrain may be used to determine a height of elements in a landscape to determine a building's location, as a non-exhaustive example, in the landscape. The AOI input may be in the form of an address, or geographical coordinates of latitude and longitude, or any other suitable identifier. The AOI 402 may include a bounded region about a particular address or point. As a non-exhaustive example, the AOI 402 may cover a square kilometer, twenty-five square kilometers or any other suitable region.

Then in S212, image data 304 for an AOI is received. The image data 304 may be received from an imagery data source 301. The image data 304 may be received by a ground point module 306 in one or more embodiments. The image data 304 may be satellite imagery acquired over multiple time points (e.g., days). It is noted that the satellite images may be acquired from different points in time, as the images are taken by a satellite in orbit. It is also noted that since the images are acquired at different points in time by orbiting satellites, the images may be taken at different positions. The image data 304 may be provided by one or more different image providers, and may be provided in different forms. As a non-exhaustive example, the image data 304 may be multiple panchromatic satellite images, which may be in grey-scale in high resolution and/or multispectral georeferenced satellite images. It is also noted that AOI may determine which source imagery is available to be received in S212, as the best images may be limited by the available images. For example, given the AOI, it may place constrains on the best images to pick based on how well they cover the AOI or the angle from which they cover the AOI.

In one or more embodiments, the image data 304 may be received by a Multi-view Stereo Reconstruction process 308 in S214 to generate a three-dimensional (3D) digital surface map (DSM) 310 in S216. The multi-view stereo reconstruction process 308 may use any suitable process to reconstruct a 3D object model from a collection of images taken from known camera viewpoints. The digital surface map 310 may, in one or more embodiments, include an elevation value for each of a plurality of points in the digital surface map 310.

In S218, the image data 304 may be received by a classifier process 312 to identify one or more elements 314 in the source imagery in S220. In one or more embodiments, the classifier process 312 may pre-identify elements in the image that may not be determined ground points, as described further below. The classifier process 312 may be trained or untrained, and may use any suitable image analysis method to identify elements in the AOI. The classifier process 312 may use any received data (e.g., satellite images, digital surface models, calculation, other vector sources) to build information that may be incorporated to identify a certain area as not terrain/ground points (e.g., the certain area may be a building or something else). These pre-identified elements may be removed from consideration as a ground point in the process described further below. In one or more embodiments, the classifier process 312 may include a plurality of classifiers 316, where each classifier may identify a respective one of water elements, ground elements, vegetation elements, roadway elements and building elements. It is noted that pre-identification or classification of elements in the image may be helpful as these elements may not be sufficiently reconstructed via the multi-view stereo reconstruction process described above, and as such they may be falsely identified as ground points. For example, a water classifier 316 may identify bodies of water in the image data 304. Bodies of water may not reconstruct easily via the multi-view stereo process. The multi-view stereo process 308 may match features between two images in order to measure the disparity of these features between the two like images. As water is featureless, points in image cannot be located that correspond to points in the like image. It is also noted that with respect to water, for example, that in addition to not placing a ground point within the body of water, the process 300 may also avoid placing a ground point near a body of water, as bodies of water typically have banks that slope and change elevation, and with a sparse sampling, it may be easier for the process to ignore the banks. In one or more embodiments, prior to use, each classifier may be trained via a machine learning process 318. The machine learning process 318 may use a plurality of satellite images with ground truth labeling of water, buildings, roads, etc. to train the classifier, so that when the classifier receives an image similar to a training image, the classifier process 312 may apply the appropriate classifier 316 to an element 314 in the received image. In one or more embodiments, S218 and S220 may occur at one of the same time, substantially the same time, and a different time than S214 and S216.

In one or more embodiments, the ground point module 306 may also receive a reference digital elevation map (DEM) 320. The reference DEM 320 may include one or more historical elevation values for at least one of the plurality of points on the digital surface map 310. In one or more embodiments the reference DEM 320 may be provided by the Shuttle Radar Tomography Mission. The reference DEM 320 may be a map of radar data gathered from around the globe that estimates where the ground is. In one or more embodiments, although historical, the reference DEM 320 may be used to validate the ground points as determined further below. For example, the ground point module 306 may determine whether the generated ground point matches, or substantially matches, the ground point in the reference DEM 320 for that same location. A match/substantial match may validate the generated ground point, while a mis-match may indicate further analysis is needed (e.g., has the ground changed, or is the generated ground point wrong).

In one or more embodiments, the ground point module 306 may also receive roadway vector data 322 in the form of a reference roadway vector map. The roadway vector map may include one or more historical roadways corresponding to at least one of the plurality of points on the digital surface map. The reference roadway vector map may be received from OpenStreetMap or any other suitable road map. It is noted that the roads may be used as locations of reliable ground points, and, as with the reference DEM 320 described above, the roadway vector data 322 may be used to validate the ground points as determined further below.

Then in S222, the ground point module 306 may execute a ground point sampling process 500 based on the received data (e.g., image data 304, multi-view stereo reconstruction 308, classifiers 316 and optionally reference DEM 320 and roadway vector data 322) to generate a ground point sampling 328. A ground point sampling is a sparse sampling across the AOI of points that when interpolated into a dense sampling may accurately represent the terrain (e.g., are likely to be on the ground). In one or more embodiments, every point in the received digital surface map data includes an elevation level value 404. It is noted that, in one or more embodiments, the elevation level values may be relative to a user-defined reference point. For example, the elevation level values may be computed in reference to a coordinate system, such as WGS 84 (World Geodetic System), which is a standard that provides different coordinates.

In one or more embodiments, the ground point sampling process 500 may be described with reference to the flow diagram in FIG. 5. As used herein, the ground point sampling process may also be referred to as "an interior ground point sampling." Initially, at S510, a mask 406 of the AOI 402 is provided. It is noted that while reference is made herein to a "mask of the AOI being provided" in S510, any designated boundary of the AOI may be received instead of a mask (e.g., coordinates of an AOI, a shape of an AOI, etc.) Then, at S512, the elevation level values 404 for the data points in the AOI 402 are received. Next in S514, any pre-identified elements 314 in the image, as identified by the classifier process, are removed from the mask 406 and therefore removed from further analysis via the ground point sampling process 500, as the pre-identified elements may not be determined ground points. As a non-exhaustive example, bodies of water identified by the water classifier 316 may be removed from further analysis in S514.

Next, in S516, the ground point module 306 may determine which of the remaining elevation level values 404 is the lowest elevation level value. It is noted that the initial lowest elevation level value may be ground. The lowest elevation level value is a ground point 408, in this instance the first ground point. Then in S518, an area around the ground point 408 is determined and marked as a ground point area 410, in this instance the first ground point area. This ground point area 410 may represent a sub-area (less than all) (e.g., 10 m of space) of the whole AOI 402. Other suitable representative sub-area sizes may be used. The representative sub-area size may be at least one of user-defined and system-defined. The ground point area 410 may be a reliable ground point. As this ground point area is a reliable ground point, it may be unnecessary to place another ground point 408 in this ground point area 410, and this ground point area is removed from the mask and removed from further analysis by the ground sampling process 500. It is then determined in S520 whether a threshold number 324 of ground points is determined.

If it is determined in S520 that the threshold number 324 of ground points is not yet determined, the process returns to S516 to determine which of the remaining elevation values 412 is the lowest elevation level value. The remaining elevation values 412 may be the elevation values outside the marked ground point area (e.g., the elevation values still present on the mask 406).

If it is determined in S520 that the threshold number 324 of ground points is determined, the process proceeds to S522 and a mask clean process 326 is executed. In the mask clean process 326, relatively small areas where no ground point is expected are removed from the mask 406. In one or more embodiments, the mask clean process 326 may be any suitable morphological application that modifies the image to eliminate small areas (e.g., slivers of mask/areas too small to place a ground point). As a non-exhaustive example, the mask clean process 326 may perform a connected-components process on areas yet to be modeled, and then filter those areas based on size. Other suitable mask clean processes 326 may be used.

After the mask clean process 326 is executed in S522, the ground point sampling process 500 returns to S516 to determine which of the remaining elevation values is the lowest elevation value.

In one or more embodiments, the ground point sampling process 500 may be executed until a user- and/or system-defined portion (e.g., percentage) of the mask 406 is removed (e.g., 90%). The remaining mask may represent an unmodeled area of the terrain. The ground point sampling process 500 may then analyze the unmodeled area of the terrain to determine whether more ground points 408 should be determined. As a non-exhaustive example, the unmodeled area of terrain may be one area that represents 10% of the mask or may be ten (10) unconnected areas that each represent 1% of the mask 406. In one or more embodiments, the ground point sampling process 500 may have a rule whereby when an unmodeled area represents 1% or less of the mask, a ground point for that area is not needed; and when the unmodeled area represents more than 1% of the mask, the process returns to S516 to determine another ground point. Completion (no more ground points are determined) of the ground point sampling process 500 results in the generation of a ground point sampling 328.

It is noted that at some point, the lowest elevation level may not be ground, and this may be addressed further below.

Turning back to the process 200, after the ground point sampling process 500 is executed in S222, an image boundary sampling process 600 may be executed in S224 to generate an image boundary sampling 334. An image boundary sampling is one or more ground points along a boundary of an AOI. It is noted that the ground point sampling process 500 and the image boundary sampling process 600 may be executed at the same time, at substantially the same time, and at different times, and in suitable any order.

The image boundary sampling process 600, described with reference to the flow diagram in FIG. 6, may begin with a determination in S610 of the one or more boundaries 414 of the AOI 402. While the non-exhaustive example shown herein has an AOI of rectangular shape, the AOI may be any suitable geometric shape. In the example of a rectangular AOI, the boundaries 414 may be a top edge 416, a bottom edge 418, a right edge 420 and a left edge 422. The boundary sampling process 600 may then continue, similarly to the ground point sampling process 500, with the difference being that in the boundary sampling process 600 the ground points are only selected from the boundaries. Continuing with the image boundary sampling process 600, then in S612, a mask of the boundaries 414 is provided. Next, at S614, the elevation level values 404 for the data points in the boundaries 414 are received. Any pre-identified elements in the image, as identified by the classifier process, are removed from the mask in S616 and therefore removed from further analysis via the image boundary sampling process 600.

In S618, the ground point module 306 may determine which of the remaining elevation level values 412 is the lowest elevation level value and this is the determined ground point 408. Then in S620, an area around the ground point is determined and marked as a ground point area 410. The ground point area 410 in the image boundary sampling process 600 may be one of a same or different size than the ground point area in the ground point sampling process 500. As above, the representative area size may be at least one of user-defined and system-defined. For example, the representative area size may begin as user defined, and based on slope of the terrain, the definition of the representative area size may be adjusted by the system to generate a tighter sampling of points along slope terrain. As this is a reliable ground point, it may be unnecessary to place another ground point 408 in this ground point area 410, and this ground point area is removed from the mask and removed from further analysis by image boundary sampling process 600. It is then determined in S622 whether a threshold number 334 of ground points is determined.

If it is determined in S622 that the threshold number 334 of ground points is not yet determined, the process returns to S618 to determine which of the remaining elevation values 412 is the lowest elevation level value.

If it is determined in S622 that the threshold number 334 of ground points is determined, the process proceeds to S624 and the mask clean process 326 is executed.

After the mask clean process 326 is executed in S624, the image boundary sampling process 600 returns to S618 to determine which of the remaining elevation values is the lowest elevation value.

In one or more embodiments, the image boundary sampling process 600 may be executed until a user- and/or system-defined portion (e.g., percentage) of the mask is removed (e.g., 90%). The image boundary sampling process 600 may determine whether the process 600 should return to 618 so that another ground point may be determined for the unmodeled area of the terrain. Completion (no more ground points are determined) of the image boundary sampling process 600 results in the generation of an image boundary sampling 332.

Turning back to the process 200, after the image boundary sampling process 600 is executed in S224 to generate the image boundary sampling 332, a roadway sampling process 336 may be executed in S226 to generate the roadway sampling 338. The roadway sampling process 336 may be executed at the same time, substantially the same time, and a different time, as at least one of the ground point sampling process 500 and the image boundary sampling process 600. In one or more embodiments, the roadway sampling process 336 may be executed similarly to the image boundary sampling process, but instead of determining one or more boundaries of the AOI, roadway data 322 may be received. The roadway data 322 may, as a non-exhaustive example, indicate highways versus main streets in a city versus neighborhood roads versus footpaths, etc. The roadway sampling process 336 may continue as the ground point sampling process whereby ground points are determined along the different roads, instead of the within an interior of the AOI. In one or more embodiments, the ground points may be determined in an order based on the type of road (e.g., ground points for all the highways may be determined first, and main street roads in a city second, and footpaths last). It is noted that the order for determining ground points in the roadway sampling process may be based on which roadways are associated with a higher level of confidence of existing (e.g., a footpath may be more likely to change than a highway).

Next, an outlier removal process 340 may be executed in S228 to remove one or more outliers from the set of determined ground points (e.g., the ground points in at least one of the generated ground point sampling 328, the generated image boundary ground point sampling 332 and the generated roadway sampling 338). The outlier removal process 340 may determine whether any points were determined to be ground points by mistake (e.g., they are not actually points on the ground). In one or more embodiments, the mistaken ground points are removed from the set of determined ground points. In one or more embodiments, any of the ground/roadway sampling processes may mistakenly place a ground point on top of a building or other element that is not ground. This may occur, for example, when there are low lying buildings on a sloped terrain. To mitigate these errors, the outlier removal process 340 may identify and remove these points.

After all the ground points have been identified, the outlier removal process 340 may analyze each point and evaluate how it compares to the ground points nearby. In one or more embodiments, the outlier removal process 340 may, for each ground point 408, analyze a user- and/or system-defined number of closest ground points to the ground point under analysis (e.g., 9 closest neighbor ground points to 25 closest neighbor ground points). In addition to the number of neighbor ground points being user- and/or system-determined, the user- and or system may determine a distance between the ground point under analysis and another ground point that may qualify the other ground point as a neighbor ground point. The outlier removal process 340 may fit a local parametric model 342 (e.g., some function) to the neighbor ground points (excluding the ground point under analysis), and then compare (e.g., measure the residual of) the ground point under analysis to that model 342. The number of neighbor ground points may be based on the complexity of the model being used. When the ground point under analysis is consistent with that model 342, the ground point under analysis may be confirmed as a ground point. When the ground point under analysis is inconsistent with that model 342, the ground point under analysis may be labeled as an outlier and may be removed from the AOI as a ground point. As a non-exhaustive example, if the neighbor ground points are flat (e.g., have the same elevation) per the model, but the ground point under analysis has an elevation that is 10 m in the air, the ground point under analysis may mistakenly be marked as a ground point, as it may be a building. The outlier removal process 340 may be one of linear process, a quadratic process, a digital elevation map (DEM)-linear process, a DEM-quadratic process, a median process, a flatness process, and any other suitable process. The outlier removal process 340 described above may be an example of a linear process. With the DEM-quadratic process, for example, the elevation of the ground point under analysis may be compared to it's corresponding point in the DEM, and then a quadratic formula may be applied to the difference of each of the neighboring points to the corresponding position in the DEM, the outcome of which may determine whether the ground point under analysis is an outlier. With the median process, for example, which may be used with more level areas, it may be determined whether the ground point under analysis agrees with the median behavior of a plurality of neighbors. With the flatness process, for example, the absolute flatness of the neighbor ground points may be analyzed, as typically man-made areas (e.g., parking lots and commercial building roofs) are very flat.

Following the outlier removal process 340, a DEM correction process 344 may be executed in S230 to remove any data points in the generated ground point sampling, the image boundary ground point sampling and the roadway sampling based on the reference digital map elevation (DEM) 320. In one or more embodiments, the DEM correction process 344 may compare each of the points in the generated ground point sampling, the image boundary ground point sampling and the roadway sampling to corresponding locations in the DEM 320 to determine whether the points in the samplings are not ground. When the comparison indicates that the ground/roadway sampling point is not ground/roadway per the DEM, the ground/roadway sampling point may be removed from the set of ground points of the AOI. In one or more embodiments, the DEM correction process 344 may be applied to less than all of the data points in the generated ground point sampling, the image boundary ground point sampling and the roadway sampling.

An interpolation process 346 may be applied to a final set of ground points in S232, where the final set of ground points is the ground points remaining in the data set after the outliers are removed in S228 and any other ground points are removed as part of the DEM correction process 344 in S230. The interpolation process 346 may estimate values between any pair of ground points in the final set. The final set of ground points and estimated values may be used by the ground point module 306 to generate a digital terrain map (DTM) in S234. In one or more embodiments, the digital terrain map 348 may by an image where every pixel represents a height of the terrain, such that the DTM provides elevations of the surface. In one or more embodiments, the DTM may be post-processed (e.g., smoothed). In one or more embodiments, as a result of the interpolation process 346, the DTM 348 may represent the entire AOI including the area of ground under objects as if the objects were not there (e.g., the ground under a building). The DTM 348 may represent the true ground, and an estimate of the ground if vegetation, buildings and other non-ground elements were not present. In one or more embodiments, the DTM 348 may be transmitted to another system for further processing. For example, the DTM 348 may be compared to the DSM 310, and the comparison may provide an estimate of where buildings are, for example. Continuing with the non-exhaustive building example, the position where the DSM of elevation minus terrain estimate of elevation is big may indicate a building (e.g., in DSM of a building, the elevation is a high number and compared to the same location on the DTM, there's a much lower elevation. Any difference greater than a few meters may be a tall tree or a building, for example). The DTM may also be used by another system for understanding water sheds (how water will flow over the terrain); urban planning; disaster relieve (it provides an idea of what used to be there); utility companies measuring height of trees; safety, agriculture, and any other suitable application.

Figure 3:
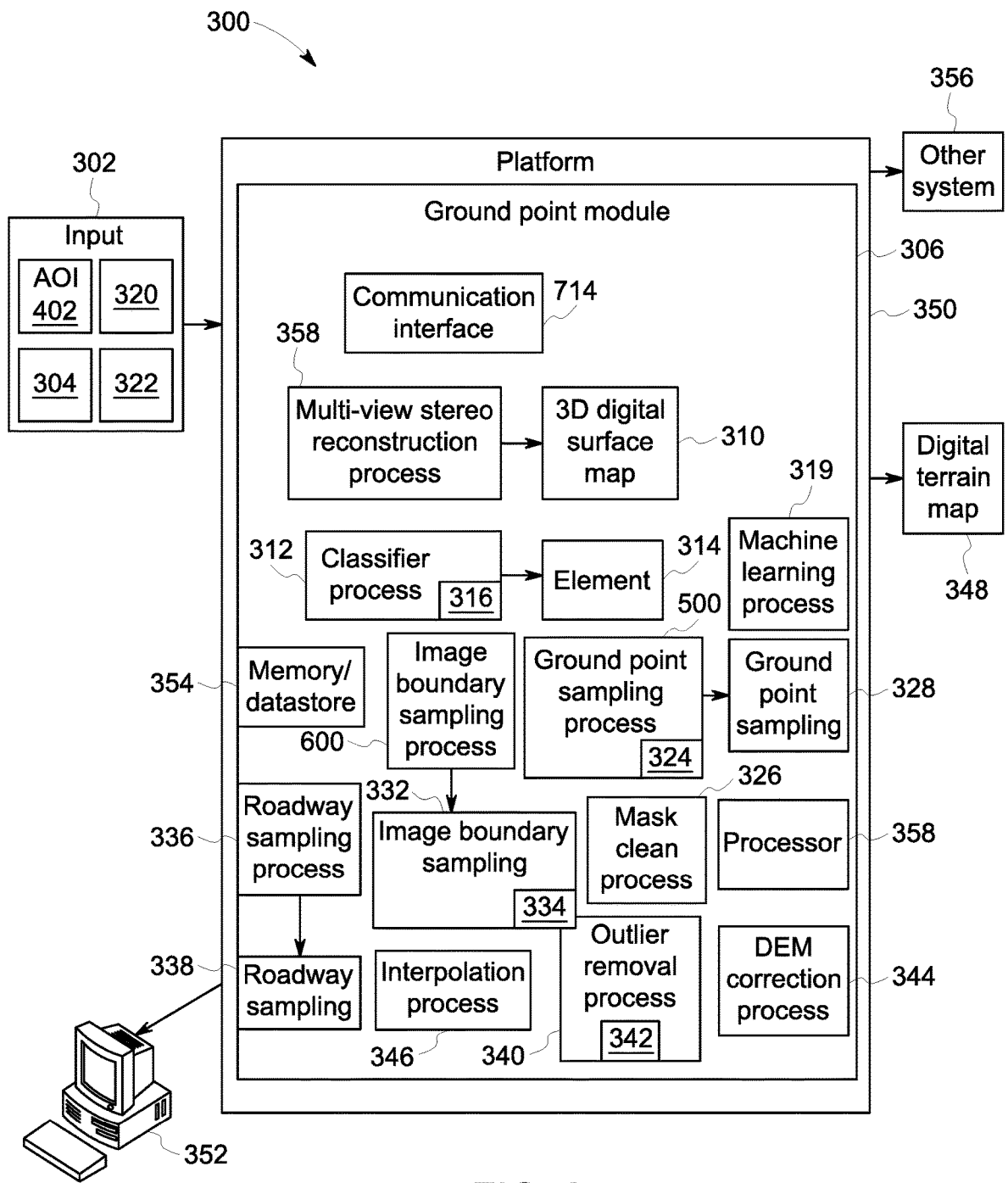
FIG. 3 is high-level block diagram of a system that may be provided in accordance with some embodiments.
Figure 4:
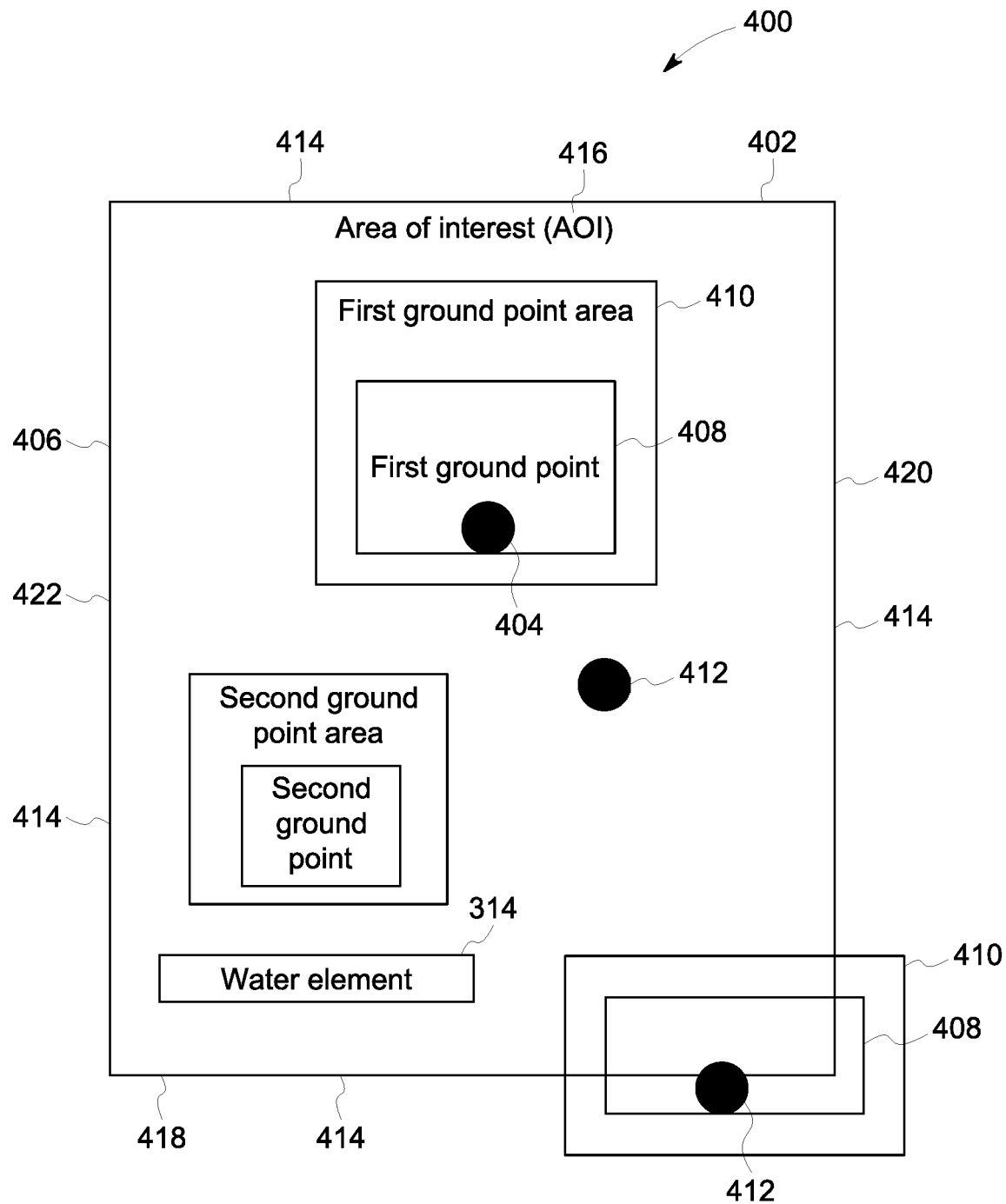
FIG. 4 is an area of interest according to some embodiments.

FIG. 3 is a block diagram of system architecture 300 according to some embodiments. Embodiments are not limited to architecture 300.

Architecture 300 includes a platform 350, a ground point module 306, a user platform 352, a data store 354 (e.g., database). In one or more embodiments, the ground point module 306 may reside on the platform 350. Platform 350 provides any suitable interfaces through which users/other systems 356 may communicate with the ground point module 306.

In one or more embodiments, the output of the ground point module 306 may be output to a user platform 352 (a control system, a desktop computer, a laptop computer, a personal digital assistant, a tablet, a smartphone, etc.) to view information about the terrain. In one or more embodiments, the output from the ground point module 306 may be transmitted to various user platforms or to other system (356), as appropriate (e.g., for display to, and manipulation by, a user, further analysis and manipulation).

In one or more embodiments, the system 300 may include one or more processing elements 358 and a memory/computer data store 354. The processor 358 may, for example, be a microprocessor, and may operate to control the overall functioning of the ground point module 306. In one or more embodiments, the ground point module 306 may include a communication controller for allowing the processor 358 and hence the ground point module 306, to engage in communication over data networks with other devices (e.g., user interface 352 and other system 356).

In one or more embodiments, the system 300 may include one or more memory and/or data storage devices 354 that store data that may be used by the module. The data stored in the data store 354 may be received from disparate hardware and software systems, some of which are not inter-operational with one another. The systems may comprise a back-end data environment employed by a business, industrial or personal context.

In one or more embodiments, the data store 354 may comprise any combination of one or more of a hard disk drive, RAM (random access memory), ROM (read only memory), flash memory, etc. The memory/data storage devices 354 may store software that programs the processor 358 and the ground point module 306 to perform functionality as described herein.

As used herein, devices, including those associated with the system 300 and any other devices described herein, may exchange information and transfer input and output ("communication") via any number of different systems. For example, wide area networks (WANs) and/or local area networks (LANs) may enable devices in the system to communicate with each other. In some embodiments, communication may be via the Internet, including a global internetwork formed by logical and physical connections between multiple WANs and/or LANs. Alternately, or additionally, communication may be via one or more telephone networks, cellular networks, a fiber-optic network, a satellite network, an infrared network, a radio frequency network, any other type of network that may be used to transmit information between devices, and/or one or more wired and/or wireless networks such as, but not limited to Bluetooth access points, wireless access points, IP-based networks, or the like. Communication may also be via servers that enable one type of network to interface with another type of network. Moreover, communication between any of the depicted devices may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

Figure 7:
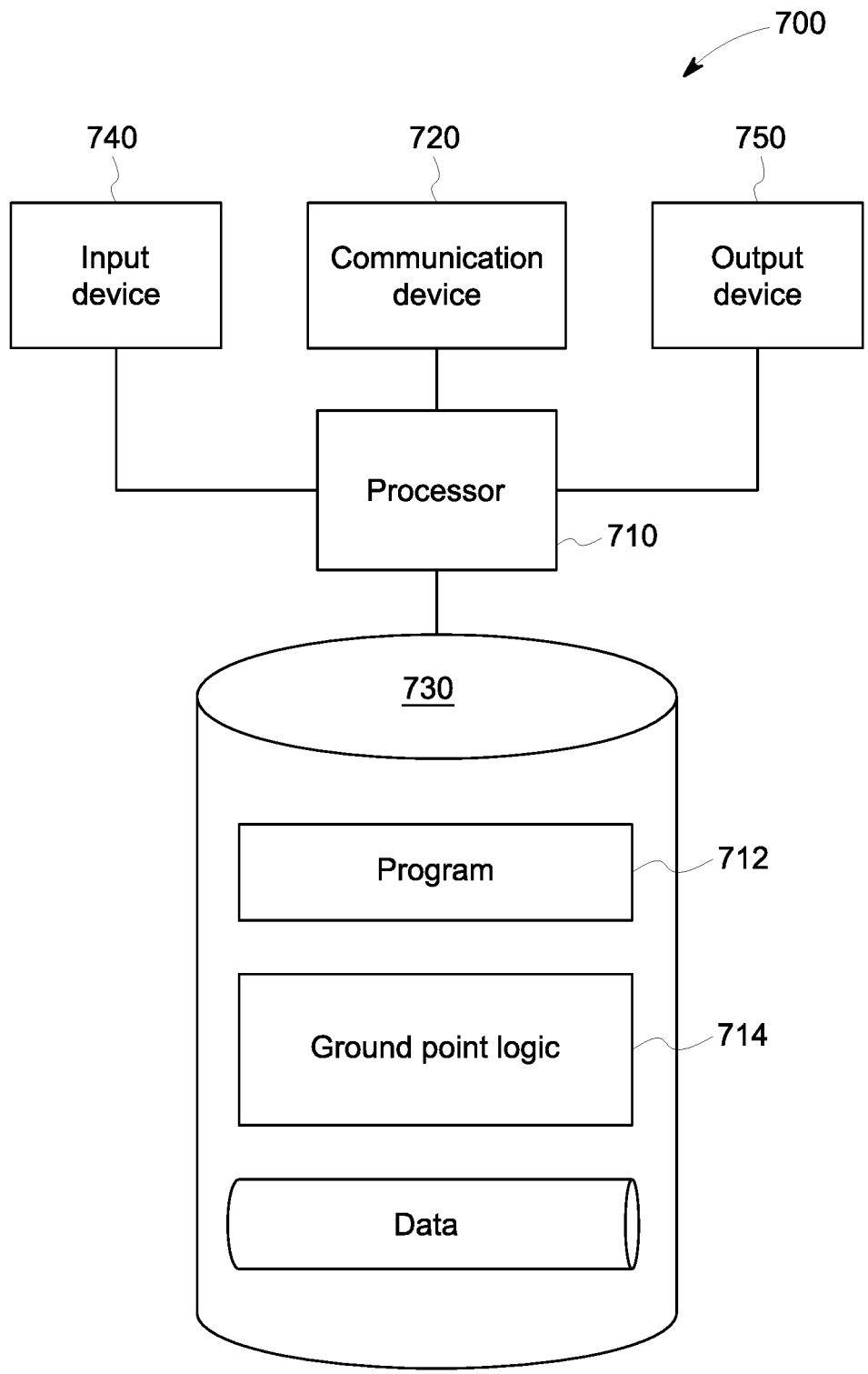
FIG. 7 is a block diagram of a ground point platform according to some embodiments of the present invention.

The embodiments described herein may be implemented using any number of different hardware configurations. For example, FIG. 7 is a block diagram of a ground point platform 700 that may be, for example, associated with the system 300 of FIG. 3. The ground point platform 700 may be implemented using any architecture that is or becomes known, including but not limited to distributed, on-premise, cloud-based and hybrid architectures, as well as embedded in another system. Embodiments are not limited to the ground point platform 700. The ground point platform 700 may be a database node, a server, a cloud platform, a user device, or the like. The ground point platform 700 comprises a processor 710, such as one or more processing devices each including one or more processing cores, and/or one or more commercially available Central Processing Units ("CPUs") in the form of one-chip microprocessors, coupled to a communication device 720 configured to communicate via a communication network (not shown in FIG. 7). In some examples the processor is a multicore processor or a plurality of multicore processors. The processor may be fixed or reconfigurable. The communication device 720 may be used to communicate, for example, with one or more imagery sources, user platforms, other systems etc. The ground point platform 700 further includes an input device 740 (e.g., a computer mouse and/or keyboard, other pointing device, keypad, a microphone, a knob or a switch, an infra-red (IR) port, a docking station, and/or a touch screen to input information) and/an output device 750 (e.g., a speaker, printer, and/or computer monitor to render a display, provide alerts, transmit recommendations, and/or create reports). The input/output devices may include an interface, a port, a cable, a bus, a board, a wire and the like. For example, data may be output to an embedded display of the ground point platform 700, an externally connected display, a display connected to the cloud, another device, and the like. According to some embodiments, a mobile device, monitoring physical system, and/or PC may be used to exchange information with the ground point platform 700.

The processor 710 also communicates with a storage device 730. The storage device 730 may comprise any appropriate information storage device, including combinations of magnetic storage devices (e.g., a hard disk drive), optical storage devices, mobile telephones, and/or semiconductor memory devices. The storage device 730 may or may not be included within a database system, a cloud environment, a web server, or the like. The storage device 730 stores a program 712 and/or ground point processing logic 714 for controlling the processor 710. The processor 710 performs instructions of the programs 712, 714, and thereby operates in accordance with any of the embodiments described herein. For example, the processor 710 may receive, from a plurality of imagery sources, elevation data. The processor 710 may then perform a process to determine ground points based on the elevation data and then generate a DTM based on the ground points.

The programs 712, 714 may be stored in a compressed, uncompiled and/or encrypted format. The programs 712, 714 may furthermore include other program elements, such as an operating system, clipboard application, a database management system, and/or device drivers used by the processor 710 to interface with peripheral devices.

As used herein, information may be "received" by or "transmitted" to, for example: (i) the ground point platform 700 from another device; or (ii) a software application or module within the ground point platform 700 from another software application, module, or any other source.

All systems and processes discussed herein may be embodied in program code stored on one or more non-transitory computer-readable media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). Moreover, note that some embodiments may be associated with a display of information to an operator.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system comprising:
   an imagery data source storing image data from a plurality of images;
   a ground point module;
   a memory storing program instructions; and
   a ground point processor, coupled to the memory, and in communication with the ground point module and operative to execute the program instructions to:
   receive image data for a defined area of interest (AOI);
   generate a digital surface map from the received image data, wherein the digital surface map includes an elevation value for each of a plurality of points of natural and built features on the digital surface map;
   generate a ground point sampling based on the elevation values for the plurality of points on the digital surface map;
   generate an image boundary sampling of one or more ground points based on elevation values for the plurality of points along a plurality of identified edges defining a boundary of a geometric shape of the area of interest, wherein the image boundary sampling only includes points along the plurality of identified edges; and
   interpolate the generated ground point sampling and the image boundary sampling to generate a digital terrain map.

2. The system of claim 1, wherein program instructions to generate the ground point sampling further comprises program instructions to:
   determine a first lowest elevation value of the elevation values for the plurality of points on the digital surface map, excluding any pre-identified elements;
   generate a first ground point area of a plurality of ground point areas based on the determined lowest elevation value;
   determine whether the ground point sampling is complete;
   determine, when the ground point sampling is incomplete, a second lowest elevation value of the elevation values for the plurality of points on the digital surface map that are outside of the first ground point area and excluding any pre-identified elements;
   generate a second ground point area based on the determined second lowest elevation value; and
   determine whether the ground point sampling is complete.

3. The system of claim 2, wherein the ground point sampling is complete when a portion of the digital surface map outside the plurality of determined ground point areas is below a threshold level.

4. The system of claim 1, further comprising program instructions to:
   remove one or more outliers, via an outlier removal process, from the generated ground point sampling and the image boundary sampling.

5. The system of claim 4, wherein the outlier removal process is one of a linear process, a quadratic process, a digital elevation map—linear process, a digital elevation map—quadratic process, a median process and a flatness process.

6. The system of claim 4, further comprising program instructions to:
   change any of the data points in the generated ground point sampling and the image boundary sampling in response to validation of the data points based on a reference digital elevation map.

7. The system of claim 1, wherein prior to generation of the ground point sampling, the ground point processor executes program instructions to:
   receive one or more classifier elements; and
   remove one or more points on the digital surface map based on the received classifier elements.

8. The system of claim 7, wherein the classifier element is one of a water classifier, a ground classifier, a vegetation classifier, a roadway classifier, and a building classifier.

9. The system of claim 1, wherein prior to generation of the ground point sampling, the ground point processor executes program instructions to:
   receive at least one of:
      a reference digital elevation map, including one or more historical elevation values for at least one of the plurality of points on the digital surface map, and
      a reference roadway vector map, including one or more historical roadways corresponding to at least one of the plurality of points on the digital surface map; and
   generate the ground point sampling based on the received at least one of the reference digital elevation map and the reference roadway vector map.

10. A method comprising:
   receiving image data for a defined area of interest (AOI);
   generating a digital surface map from the received image data, wherein the digital surface map includes an elevation value for each of a plurality of points of natural and built features on the digital surface map;
   generating a ground point sampling based on the elevation values for the plurality of points on the digital surface map;
   generating an image boundary sampling of one or more ground points based on elevation values for the plurality of points along a plurality of identified edges defining a boundary of a geometric shape of the area of interest, wherein the image boundary sampling only includes points along the plurality of identified edges; and
   interpolating the generated ground point sampling and the image boundary sampling to generate a digital terrain map.

11. The method of claim 10, wherein generating the ground point sampling further comprises:
   determining a first lowest elevation value of the elevation values for the plurality of points on the digital surface map excluding any pre-identified elements;
   generating a first ground point area of a plurality of ground point areas based on the lowest elevation value;
   determine whether the ground point sampling is complete;
   determining, when the ground point sampling is incomplete, a second lowest elevation value of the elevation values for the plurality of points on the digital surface map that are outside of the first ground point area and excluding any pre-identified elements;

generating a second ground point area based on the determined second lowest elevation value; and determining whether the ground point sampling is complete.

12. The method of claim 11, wherein the ground point sampling is complete when a portion of the digital surface map outside the plurality of determined ground point areas is below a threshold level.

13. The method of claim 10, further comprising:

removing one or more outliers, via an outlier removal process, from the generated ground point sampling and the image boundary sampling.

14. The method of claim 13, further comprising:

changing any of the data points in the generated ground point sampling and the image boundary sampling in response to validation of the data points based on a reference digital elevation map.

15. The method of claim 10, wherein prior to generating the ground point sampling:

receiving one or more classifier elements; and removing one or more points on the digital surface map based on the received classifier elements.

16. The method of claim 15, wherein the classifier element is one of a water classifier, a ground classifier, a vegetation classifier, a roadway classifier, and a building classifier.

17. The method of claim 10, wherein prior to generating the ground point sampling:

receiving at least one of:

a reference digital elevation map, including one or more historical elevation values for at least one of the plurality of points on the digital surface map, and a reference roadway vector map, including one or more historical roadways corresponding to at least one of the plurality of points on the digital surface map; and generating the ground point sampling based on the received at least one of the reference digital elevation map and the reference roadway vector map.

18. A non-transient, computer-readable medium storing instructions to be executed by a processor to perform a method comprising:

receiving image data for a defined area of interest (AOI);

generating a digital surface map from the received image data, wherein the digital surface map includes an elevation value for each of a plurality of points of natural and built features on the digital surface map;

generating a ground point sampling based on the elevation values for the plurality of points on the digital surface map;

generating an image boundary sampling of one or more ground points based on elevation values for the plurality of points along a plurality of identified edges defining a boundary of a geometric shape of the area of interest, wherein the image boundary sampling only includes points along the plurality of identified edges; and interpolating the generated ground point sampling and the image boundary sampling to generate a digital terrain map.

19. The medium of claim 18, wherein generating the ground point sampling further comprises:

determining a first lowest elevation value of the elevation values for the plurality of points on the digital surface map and excluding any pre-identified elements;

generating a first ground point area of a plurality of ground point areas based on the determined lowest elevation value;

determining whether the ground point sampling is complete;

determining, when the ground point sampling is incomplete, a second lowest elevation value of the elevation values for the plurality of points on the digital surface map that are outside of the first ground point area and excluding any pre-identified elements;

generating a second ground point area based on the determined second lowest elevation value; and determining whether the ground point sampling is complete.

20. The medium of claim 19, wherein the ground point sampling is complete when a portion of the digital surface map outside the plurality of determined ground point areas is below a threshold level.

* * * * *